Sept. 28, 1965 U. F. GIANOLA 3,209,159
DIODE SHIFT REGISTER
Filed Aug. 11, 1960 2 Sheets-Sheet 1

INVENTOR
U. F. GIANOLA
BY W. L. Keefauver
ATTORNEY

Sept. 28, 1965 U. F. GIANOLA 3,209,159

DIODE SHIFT REGISTER

Filed Aug. 11, 1960 2 Sheets-Sheet 2

INVENTOR
U. F. GIANOLA
BY W. L. Keefauver
ATTORNEY

United States Patent Office 3,209,159

Patented Sept. 28, 1965

3,209,159

DIODE SHIFT REGISTER

Umberto F. Gianola, Florham Park, N.J., assignor to Bell Telephone Laboratories, Incorporated, New York, N.Y., a corporation of New York Filed Aug. 11, 1960, Ser. No. 48,921

15 Claims. (Cl. 307—88.5)

Figure 1:
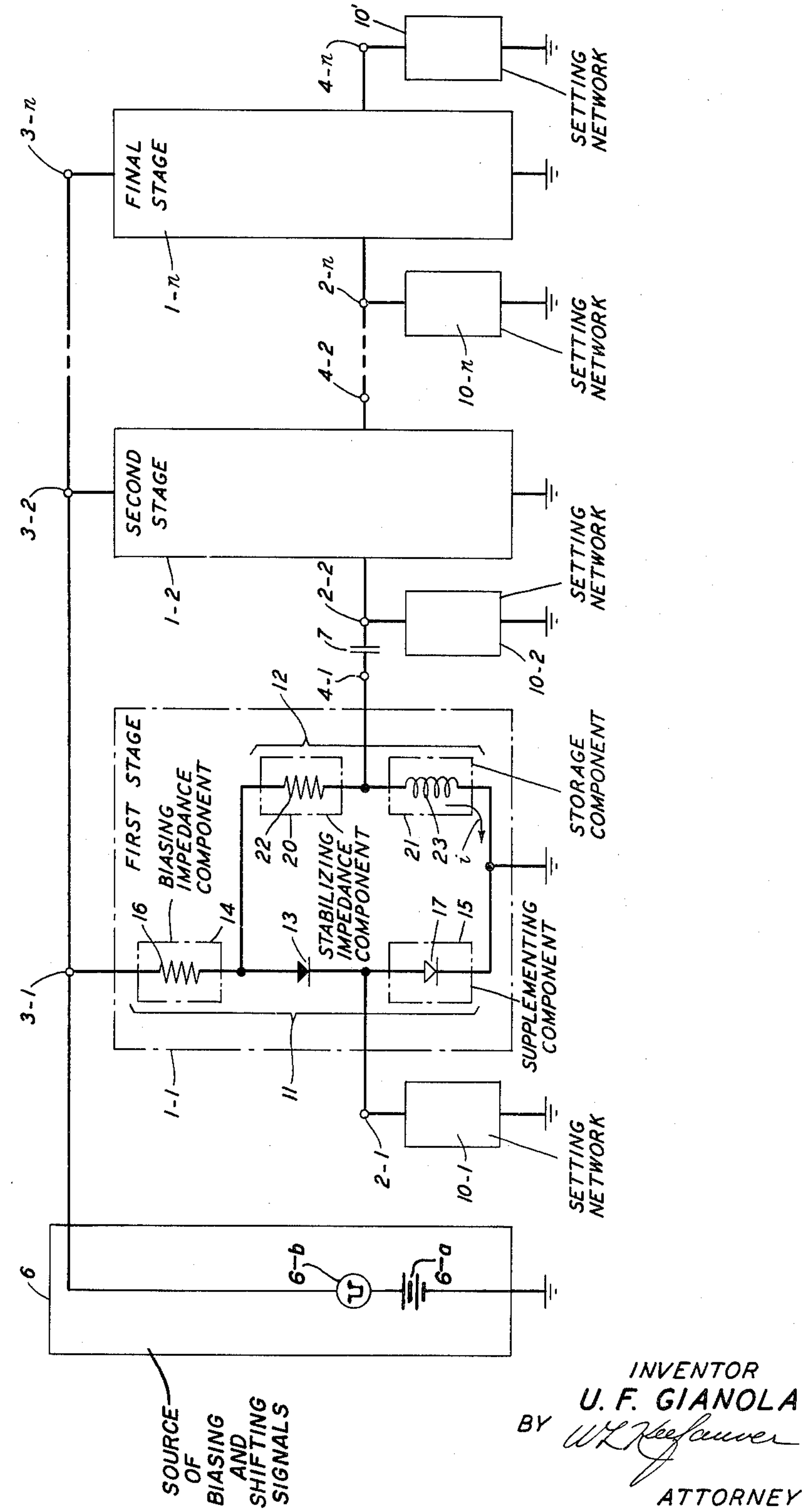

This invention relates to a shift register in which information states are stored in diode elements. It has for its general object the simplification of such a register.

A shift register employs a group of tandem connected stages for individually storing information states that are initially set by distinctive code signals. For a given setting of the register stages, the information state of each preceding stage may be shifted to a succeeding stage under the control of a shifting signal. When each stage is multistable, its information state depends upon the discrete signal level established within it.

In a typical shift register, each multistable stage is made up of at least two diversely conducting active elements. A change in information state is then occasioned by a redistribution of the conduction conditions, and a shift of the information state to a succeeding stage is effected with a transfer unit.

On the other hand, it is possible to attain multistability with a reduced number of active elements where those elements are voltage-controlled diodes. For example, where binary information is to be handled, only two information states per stage are involved and they are readily provided by the bistable operation of a single voltage controlled diode. However, such a diode is bilateral as well as bistable in that it permits the backward as well as the forward shift of its information state. Backward shifting has been prevented by using supplementary shifting signals in conjunction with a plurality of voltage-controlled diodes per stage. This makes it possible to block those diodes that are not transferring information states or responding to the transfers. A common multiple diode arrangement for handling binary information is discussed by E. Goto, et al., in the Institute of Radio Engineers Transactions on Electronic Computers, 1960, vol. EC–9, page 25. Such an arrangement has three diodes per stage and requires three occurrences of a shifting signal for each shift of an information state to a succeeding stage.

Accordingly, it is an object of the invention to achieve the unidirectional transfer of an information state from one stage to another of a diode shift register for but a single occurrence, as contrasted with a multiple occurrence, of a shifting signal. A related object is to achieve binary operation with a single voltage-controlled diode per stage.

During the operating cycle of a shift register stage, several operating signals are present. These are provided by setting and shifting signals as well as by the output signal that on occasion sets a neighboring stage. When voltage-controlled diodes are the basic constituents of a shift register, the various operating signals appear at one or the other of the diode terminals and consequently are capable of interfering with each other.

Accordingly, it is a further object of the invention to prevent the interaction of operating signals associated with changes in the signal level of a diode shift register stage.

The invention prescribes the employment in each register stage of a voltage-controlled diode with at least one negative resistance region in its current-voltage characteristic. Such a diode may be rendered multistable by being combined with a biasing impedance component and a biasing voltage. For selected impedance and voltage magnitudes the impedance characteristic intersects that of the diode in more than one region of positive resistance. Consequently, if a given diode is initially in an equilibrium condition at a low voltage signal level, an applied signal exceeding the low voltage threshold of its characteristic can cause the diode to assume an equilibrium condition at a higher voltage signal level. According to the invention, this change in state is effected by a voltage which supplements that of the biasing source and is of opposite polarity from the voltage previously appearing at the output of each stage.

To prevent a backward transfer of a change in signal level, while assuring its forward transfer to a succeeding stage, each preceding stage includes a transfer unit with stabilizing impedance and storage components. Because of the isolating effect of the stabilizing impedance component, a change in signal level caused by a setting signal affects only the stage to which it is applied. This signal level determines the extent of the energy stored in the storage component. Thereafter, when a shifting signal is applied, the signal level is lowered and the resulting partial collapse of the energy field of the storage component generates an output voltage of reversed polarity which is capable, given sufficient energy storage, of setting a subsequent stage but is prevented from making a backward transfer by the stabilizing impedance component. A premature transfer of the information state is prevented by the momentary delay in the effect of the generated output signal at the subsequent stage attributable to its input impedance.

Figure 2:
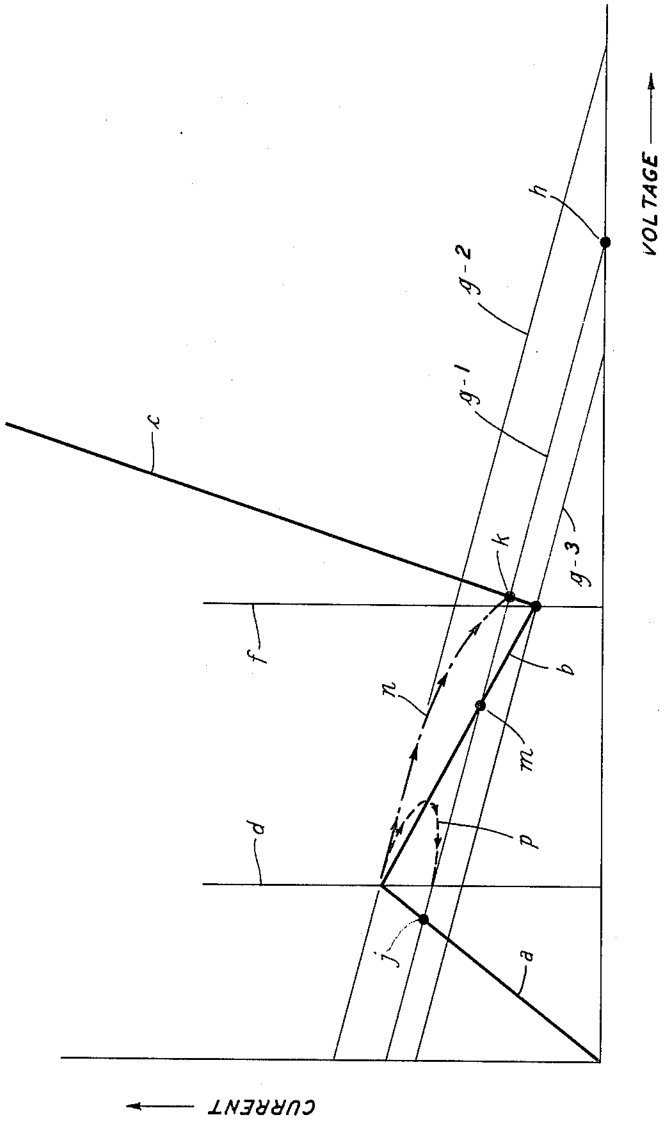

The accomplishment of the above and related objects is demonstrated by an illustrative embodiment of the invention taken in conjunction with the drawings in which:

FIG. 1 is a block diagram, partially in schematic form, of a diode shift register arranged according to the invention; and FIG. 2 is a plot of characteristic curves explanatory of the operation of the shift register of FIG. 1.

Turn now to FIG. 1 showing the several stages, 1–1 thru **1–*n*, of a diode shift register arranged in tandem for binary operation. Each stage has distinct setting, shifting and output terminals, 2–1 thru 2–*n*, 3–1 thru 3–*n*, and 4–1 thru 4–*n*. The shifting terminals, 3–1 thru 3–*n*, are jointly connected to a source 6 of biasing and shifting signals, while the output and setting terminals, 4 and 2, of all stages except the first and the last are interconnected by a coupling component 7, typically a capacitor. In addition, setting networks 10–1 thru 10–*n* are connected to respective setting terminals 2, and a final setting network 10′ is connected to the final output terminal 4–*n*. During parallel operation of the register, the setting networks 10 are used for applying to or extracting from various ones of the shift register stages 1** simultaneously occurring code signals.

For serial operation of the register, code signals are applied to the first one 10–1 of the setting networks or are extracted from the last one 10′ of them. Thus, on occasion the setting networks 10 are sources of setting signals.

Each stage 1 includes a principal path 11 for establishing multistable information states and a shunting auxiliary path 12 for unidirectionally transferring the information states.

Besides a single voltage-controlled diode 13, the principal path 11 contains a biasing impedance component 14 and a voltage supplementing component 15, typically a biasing resistor 16 and a unilaterally conducting diode 17. The elements 13, 16 and 17 of the principal path 11 are serially connected and the diodes 13 and 17 are similarly poled.

The transfer unit formed by the auxiliary path 12 shunting the principal path 11 contains the series combination of stabilizing impedance and storage components 20 and 21, typically a stabilizing resistor 22 and an inductor 23. The output of the stage 1 is taken at the common connection 4 of the stabilizing and storage components 20 and 21.

Consider the operation of the shift register of FIG. 1 by referring to the idealized characteristic curves in FIG. 2 for one stage of the register. The voltage-controlled diode 13 in the principal path 11 displays a current-voltage characteristic with three regions of direct current resistance represented, for simplicity, by linear segments $a$, $b$, and $c$. For voltage magnitudes less than that of the low voltage threshold $d$ and greater than that of the high voltage threshold $f$, the regions are of positive resistance represented by segments $a$ and $c$. Between the two thresholds there is a region of negative resistance represented by segment $b$. Furthermore, aside from the effect of the impedance of the biasing resistor 16 in FIG. 1, the diode characteristic may be taken to represent the entire stage inasmuch as the resistive contributions from the supplementing diode 17 and the stabilizing resistor 22 are negligible. The supplementing diode 17 has a forward resistance of small magnitude and the stabilizing resistor 22 provides a shunting resistance of appreciable magnitude.

To achieve bistability, the biasing resistor 16 is chosen to have a direct current resistive magnitude whose characteristic $g$ has a slope less steep than that of the diode characteristic in the negative resistance region represented by segment $b$. Consequently, for a suitable magnitude $h$ of supply voltage from the battery 6–$a$ of the biasing source 6 in FIG. 1 the biasing impedance characteristic 9–1 will intersect that of the diode at three points. Two of the intersections respectively define low voltage and high voltage equilibrium signal levels $j$ and $k$. The remaining intersection is in the negative resistance region and defines an unstable equilibrium voltage point $m$. The low voltage signal level $j$ is advantageously close to the low voltage threshold $d$ in order to minimize the amount of energy needed to effect an interchange in signal levels. At the same time the separation between the low voltage signal level $j$ and the low voltage threshold $d$ must be sufficient to prevent a premature interchange.

When a positive biasing signal $h$ in FIG. 2 is applied at the shifting terminal of the stage 1 in FIG. 1, the voltage-controlled diode 13 assumes its low voltage signal level $j$ which is designated as an information state corresponding to a binary "zero." This voltage level $j$ causes the inductor 23 of the transfer unit to store energy $e$ according to the well-known relation $$e=\tfrac{1}{2}Li^2$$

where $i$ is the current passing through the inductor 23 and L is its inductive magnitude. The instantaneous inductive current is of a magnitude determined by dividing the instantaneous voltage magnitude by that of the stabilizing impedance. It is to be noted that the setting network 10 is effectively isolated from the biasing signal $h$ since the supplementary diode 17 offers a negligible resistance to the flow of biasing current.

To set a typical stage 1–1 with an information state indicating the storage of a binary code signal, a negative polarity code signal is applied at the setting terminal 2, thus biasing the supplementing diode 17 in its reverse direction. This setting voltage is essentially confined to the principal path 11 by the isolating effect of the stabilizing impedance component 20. It has sufficient energy to displace the biasing impedance characteristic g–1 beyond the low voltage threshold $d$, as indicated by the displaced characteristic $g$–2, whereupon the voltage-controlled diode 13 begins to change state. If the setting voltage endures until the operating locus $n$ passes beyond the unstable equilibrium voltage point $m$, its subsequent termination will not prevent the voltage-controlled diode 13 from reaching the high voltage signal level $k$ indicative of a stored information state corresponding to a binary "one." However, a premature termination of the setting voltage fails to effect switching as demonstrated by the abbreviated locus $p$, according to which the voltage-controlled diode 13 returns to its low voltage signal level $j$. Because of voltage polarity considerations, the transition in signal levels has no effect on the subsequent stage 1–2, but it does cause increased current flow and energy storage in the inductor 23. To effect a transfer of the stored information state to a subsequent stage 1–2, a shifting signal from the biasing source 6 is applied for a sufficient time duration to displace the biasing impedance characteristic $g$–1 below the high voltage threshold $f$, as indicated by the displaced characteristic $g$–3 whereupon the voltage-controlled diode 13 begins to return to its lower voltage signal level $j$. This decreasing change in the voltage condition causes a gradual collapse of the magnetic field of the inductor 23 and induces a voltage of proper polarity to act as a source of a setting signal by supplementing the voltage of the voltage-controlled diode of the succeeding stage 1–2. Because of the stabilizing impedance component 20, the induced voltage is prevented from changing the voltage level of the voltage-controlled diode 13 in the principal path 11, but when taken in combination with the reduced magnitude of the biasing voltage during resetting, it may be sufficient to set the succeeding stage 1–2. If it is not, the resetting interval is controlled so that the setting voltage created by the collapse of the inductor storage field augments the driving voltage at the termination of the resetting interval and then sets the succeeding stage 1–2. The shifting signals are obtainable from an individual source 6–$b$ or by interrupting the biasing signals of the source 6–$a$. To enhance the isolation afforded by the stabilizing impedance component 20, it is advantageous for the component 20 to provide a substantially higher impedance for transient signals than for steady-state ones, as, for example, by a non-linear diode.

It is apparent that the time constant of the closed circuit formed by the inductor 23 with the succeeding stage 1–2 is adjustable to furnish a momentary delay sufficient to avoid a premature transfer of an information state.

Thus, the transfer unit formed by the auxiliary path 12 assures a unidirectional transfer of an information state from one stage to another of a diode shift register for but a single occurrence of a shifting signal.

A variety of driving mechanisms, biasing arrangements, input and output networks and various constituent components of the shift register stages, including the transfer units, will occur to those skilled in the art.

What is claimed is:

1. In combination with a first source and a second source, a closed loop formed of four tandem connected elements which are similarly poled first and second diodes, the first of which has a negative resistance characteristic, an inductor and a resistor connected in series, means connected directly to said resistor and the first of said diodes for biasing both of said diodes in their forward directions by the first source, and means for biasing only the second of said diodes in its reverse direction by the second source.

2. A logic stage which comprises a closed loop, comprising first and second diodes, an inductor, and a resistor connected directly in tandem in the order named, the first of said diodes having a voltage-controlled characteristic displaying a region of negative resistance between a first region of positive resistance for low voltages and a second region of positive resistance for high voltages, first means for biasing said diodes in their forward directions to cause the first of said diodes to assume a low voltage signal level of stable equilibrium within said first region of positive resistance and to cause in said inductor a current flow determined by said low voltage signal level, second means for reversely biasing the second of said diodes to cause the first of said diodes to assume a high voltage signal level of stable equilibrium within said second region of positive resistance, thus to cause an increase of current flow in said inductor, and means for interrupting said first biasing means to cause a reduction of said current flow thereby producing, across said inductor, a transient voltage of magnitude dependent upon the rate of said reduction and of polarity inhibited from substantially interfering with the biasing of said diodes by the effect of said resistor.

3. In a shift register stage having a bistable network with a voltage-controlled negative resistance diode having first and second terminals, said diode being set at a stable low voltage level by a driving source and being capable of assuming a stable high voltage level, means interconnecting one terminal of said diode with a common potential point for momentarily supplementing the voltage across said diode thus causing said diode to assume said stable high voltage level, means interconnecting the other terminal of said diode with said common potential point for storing electromagnetic field energy under the control of the voltage developed across the terminals of said diode and in proportion thereto, and means for interrupting said driving source to cause the electromagnetic field of said storing means to collapse, thereby to induce in said storing means a voltage of the same polarity as that of said supplementing means.

4. A shift register which comprises
- a plurality of principal paths connected in parallel, each comprising
  - a unilaterally conducting impedance element having an anode and a cathode,
  - a negative resistance diode having a cathode and an anode, the cathode of said negative resistance diode being connected to the anode of said unilaterally conducting impedance element,
  - and a biasing impedance component connected to the anode of said negative resistance diode;
- a plurality of transfer units intercoupling successive ones of said paths, each comprising
  - a stabilizing impedance component connected jointly to the anode of said negative resistance diode and said biasing impedance component of a preceding principal path.
  - an inductor interconnecting said stabilizing impedance component with the cathode of the said unilaterally conducting impedance element,
  - and a capacitor jointly interconnecting said inductor and said stabilizing impedance component with the anode of a unilaterally conducting impedance element in a succeeding principal path;
- and means connected in shunt with said principal paths for variably biasing them.

5. Apparatus as defined in claim 4 further including means for individually reverse biasing said unilaterally conducting impedance elements thereby to set selected ones of said diodes in accordance with a prescribed binary code.

6. Apparatus as defined in claim 5 further including means for sequentially reverse biasing the first of said unilaterally conducting impedance elements in response to a serially coded information signal.

7. Apparatus as defined in claim 4 wherein said stabilizing impedance component inhibits the back propagation of a voltage signal during variations of the biasing means and comprises a resistive element.

8. Apparatus as defined in claim 4 wherein said stabilizing impedance component comprises a nonlinear impedance element displaying an appreciable impedance for transient magnitudes of the voltages generated by said inductor and a negligible impedance for the voltage of the stable high voltage condition.

9. A shift register comprising
- a plurality of paths connected in shunt, each path including a bistate device having a first signal level and a second signal level,
- means for setting each bistate device at one of the two signal levels,
- means for resetting the entirety of the bistate devices at one of said signal levels,
- and, for each of prescribed ones of said bistate devices, transfer means which comprises
  - means connected in shunt with the prescribed bistate device for storing energy in proportion to the signal level thereof and for generating a transient signal in response to the resetting of said prescribed bistate device,
  - and means for coupling said transient signal to the bistate device of a succeeding path.

10. Apparatus as defined in claim 9 wherein each of said bistable networks comprises a voltage-controlled negative resistance diode displaying a negative resistance characteristic, the bistability of each network being attributable to said negative resistance characteristic.

11. Apparatus as defined in claim 9 wherein said storage means comprises means for storing magnetic field energy.

12. Apparatus as defined in claim 10 wherein said setting means comprises means for supplementing the voltage appearing across said diode.

13. Apparatus as defined in claim 12 wherein said setting means comprises a unilaterally conducting impedance element directly interconnecting said diode with said energy storage means.

14. A logic stage comprising
- a rectifying diode having an anode and a cathode,
- an inductor connected to the cathode of the said rectifying diode,
- a negative resistance diode having a cathode and an anode,
- the cathode of said negative resistance diode being connected to the anode of said rectifying diode,
- a first resistor interconnecting said inductor with the anode of said negative resistance diode, a second resistor connected to the anode of said negative resistance diode,
- means connected to said second resistor for jointly biasing said rectifying diode and said negative resistance diode in their forward directions of current flow,
- and means for biasing said rectifying diode in its reverse direction of current flow.

15. A shift register constituted of a plurality of tandem-connected stages, at least one of which comprises
- a negative resistance device, an energy storage device connected in shunt with said negative resistance device,
- means for biasing said negative resistance device to a first state of stable equilibrium producing a proportionate first energy level in said storage device,
- means for generating a signal setting said negative resistance device to a second state of stable equilibrium producing a proportionate second energy level in said second storage device,
- means for restoring said negative resistance device to its first state of stable equilibrium to generate in said storage device a setting signal for a succeeding stage of said register means interconnecting said storage device with said succeeding stage for applying the generated setting signal thereto.

References Cited by the Examiner

UNITED STATES PATENTS

| | | | |
|---|---|---|---|
| 2,922,985 | 1/60 | Crawford | 328—37 |
| 2,944,164 | 7/60 | Odell et al. | 307—88.5 |
| 3,053,999 | 9/62 | Baudin | 307—88.5 |
| 3,075,088 | 1/63 | Li | 307—88.5 |
| 3,089,126 | 5/63 | Miller | 307—88.5 X |

OTHER REFERENCES

Pub. I: IBM Technical Disclosure Bulletin, vol. 2, No. 6, April 1960, page 102.

JOHN W. HUCKERT, *Primary Examiner.*

GEORGE N. WESTBY, *Examiner.*